Feb. 22, 1966   F. B. HAMACHEK III, ET AL   3,236,035
COMBINE FOR LEGUMINOUS CROPS SUCH AS GREEN PEAS AND LIMA BEANS
Filed June 11, 1963                                    8 Sheets-Sheet 1

Fig. 1

INVENTORS
FRANK B. HAMACHEK III
RALPH J. HARKER
BY
Wheeler, Wheeler & Wheeler
ATTORNEYS Feb. 22, 1966  F. B. HAMACHEK III, ET AL  3,236,035
COMBINE FOR LEGUMINOUS CROPS SUCH AS GREEN PEAS AND LIMA BEANS
Filed June 11, 1963  8 Sheets-Sheet 2

INVENTORS
FRANK B. HAMACHEK III
RALPH J. HARKER

Wheeler, Wheeler & Wheeler
ATTORNEYS

Feb. 22, 1966 F. B. HAMACHEK III, ET AL 3,236,035
COMBINE FOR LEGUMINOUS CROPS SUCH AS GREEN PEAS AND LIMA BEANS
Filed June 11, 1963 8 Sheets-Sheet 3

Fig. 3

INVENTORS
FRANK B. HAMACHEK III
RALPH J. HARKER
BY
Wheeler, Wheeler & Wheeler
ATTORNEYS Feb. 22, 1966     F. B. HAMACHEK III, ET AL     3,236,035
COMBINE FOR LEGUMINOUS CROPS SUCH AS GREEN PEAS AND LIMA BEANS
Filed June 11, 1963     8 Sheets-Sheet 7

INVENTORS
FRANK B. HAMACHEK III
RALPH J. HARKER
BY
Wheeler, Wheeler & Wheeler
ATTORNEYS Feb. 22, 1966  F. B. HAMACHEK III, ET AL  3,236,035
COMBINE FOR LEGUMINOUS CROPS SUCH AS GREEN PEAS AND LIMA BEANS
Filed June 11, 1963  8 Sheets-Sheet 8

INVENTORS
FRANK B. HAMACHEK III
RALPH J. HARKER
BY
Wheeler, Wheeler & Wheeler
ATTORNEYS

# United States Patent Office 3,236,035
Patented Feb. 22, 1966

3,236,035
COMBINE FOR LEGUMINOUS CROPS SUCH AS GREEN PEAS AND LIMA BEANS
Frank B. Hamachek III, Kewaunee, and Ralph J. Harker, Madison, Wis., assignors to Frank Hamachek Machine Company Inc., Kewaunee, Wis., a corporation of Wisconsin
Filed June 11, 1963, Ser. No. 287,137
13 Claims. (Cl. 56—19)

This invention relates to a combine for leguminous crops such as green peas and lima beans.

A major feature of the combine is a gimbal mounting of a generally conventional viner with automatically controlled hydraulic adjustment of level. A yoke is pivotally oscillatable about a longitudinal axis to accommodate roll adjustment of the viner with respect to the axle and the viner frame is pivoted to the yoke on a transverse axis to accommodate pitch adjustment of the viner. Double acting hydraulic rams are preferably employed to adjust the yoke and viner frame upon their respective axes of pivotal adjustment and these are subject to hydraulic pressure controlled by four solenoid valves respectively energized by switches actuated by floats.

The float control is a feature of the invention. In the preferred organization, there are four floats at the ends of arms which project at 90 degree spacing from a vertical switch actuating rod at the center of a shallow cruciform trough having separate branches for the respective floats. The liquid in which the floats are disposed is very shallow, the vertical height of the switch actuator being sufficient so that the device is extremely sensitive and accomplishes its purpose without sufficient liquid in the trough to risk splashing or loss of liquid during operation.

The viner can be varied as to performance by changes in the angle of the screen or variation in relative level of beater cylinder and sieve drum. The control is adjustable for varying this angle according to the characteristics of the pods from which the product is to be threshed.

Another feature of the invention is provision of a telescopic elevating system for raising the leguminous crop material.

Due to pitch adjustment of the viner, there may be substantial range of movement between the pickup which lifts the crop from the ground and the point at which material must be discharged into the mouth of the viner. A telescopic elevator accommodates itself to the varying distance of travel between pickup and thresher. The pickup apparatus is also desirably pivotally self-adjustable to follow the contour of the ground and to deliver the crop on the telescopic elevator regardless of variation in ground level.

Another important feature of the invention is the arrangement for collecting the threshed crop, including return from a gleaner in the vine discharge system. The crop is delivered into a pendular hopper which can be raised to permit a receiving truck to be driven beneath it. Into such a truck the crop accumulated in the hopper can be dumped. Provision is made for controlling the position of the hopper and delivery of the crop thereto.

Figure 2:
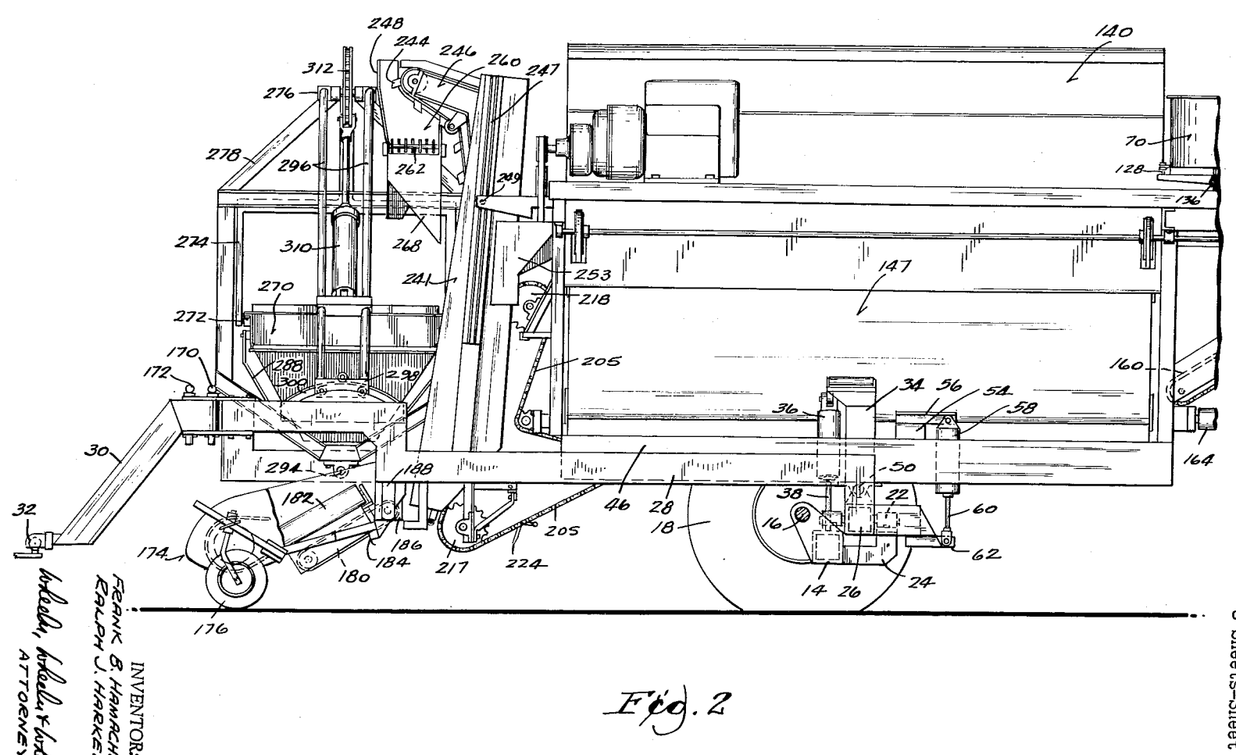
FIG. 2 is a view of the combine in left side elevation.

The combine may conveniently be assembled upon a wheel-supported axle 14. In the specific embodiment shown, the skeins 16 for the wheels 18 happen to be offset somewhat forwardly from the axle as clearly appears in FIGS. 2 and 11. Directly on the axle is a bearing 20. An aligned bearing 22 is connected with the axle by a bracket 24. Pivotally supported from the axle by means of these bearings is a cross member 26 of a yoke 28 which is a part of the gimbal joint structure that supports the viner. The pivotal connection of the yoke to the axle permits the yoke to have considerable roll movement about the longitudinal axis of the viner. The tow bar 30 may be connected to the yoke 28 and has a swivel coupling 32 for detachable connection with a conventional ball on a towing vehicle. The swivel coupling permits the desired roll adjustment of the yoke with respect to the towing vehicle as well as with respect to the axle 14 of the combine. It has been found not to be essential that the coupling 32 be aligned with the axis of bearings 20 and 22.

Figure 12:
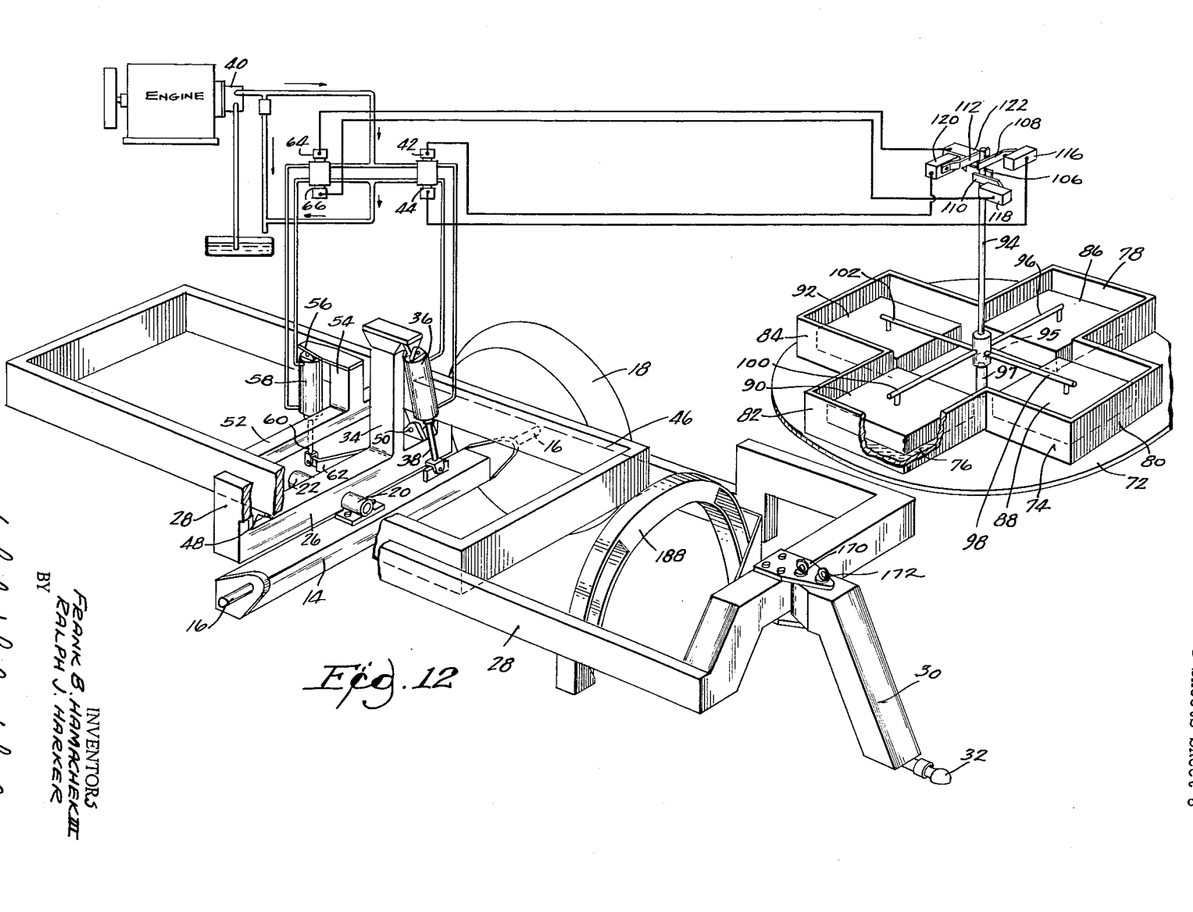
FIG. 12 is a diagrammatic view in perspective, with portions broken away, showing the gimbal joint support for the viner and the automatic levelling means therefor.
Figure 13:
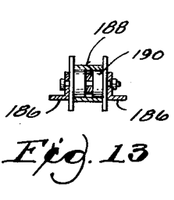
FIG. 13 is a detail view in cross section on the line 13—13 of FIG. 4.

As shown in FIG. 12, the yoke 28 has an upstanding post 34 which serves as an anchorage for the cylinder 36 of a double acting ram whose piston is connected by piston rod 38 pivotally with the axle. Since the post 34 is offset laterally from the axis of pivotal connection of the yoke to the axle on bearings 20, 22, it will be apparent that expansion of the ram 36 will cause the yoke 28 to roll to the left as viewed in FIG. 12, whereas contraction of the overall length of the ram will cause the yoke to roll to the right. Power for expanding and contracting the overall length of ram 36 is derived from an engine driven pump 40, subject to the control of solenoid valves 42 and 44 respectively, these being energized by the regulating mechanism hereinafter described.

Figure 9:
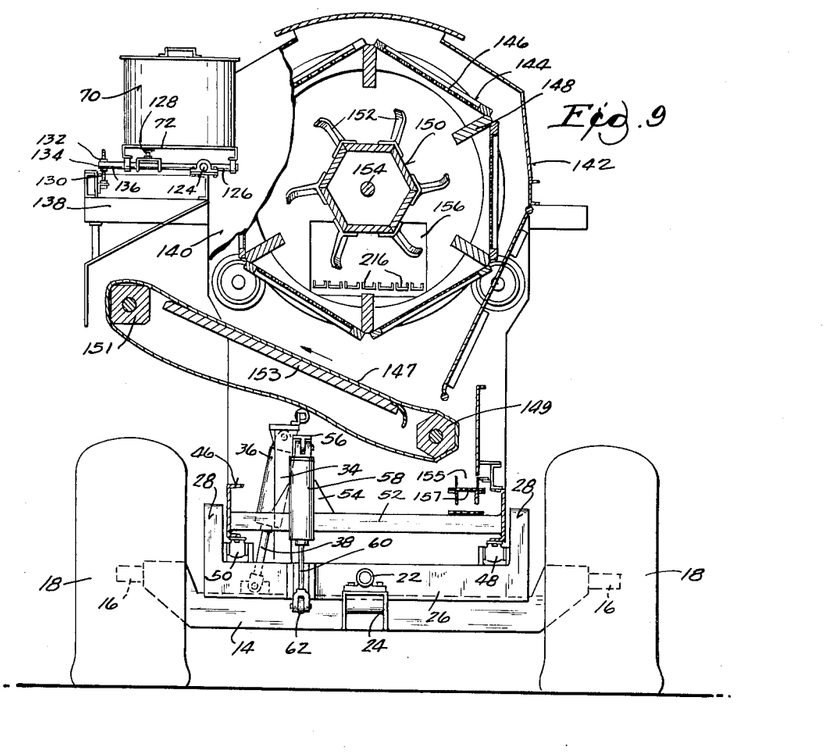
FIG. 9 is a fragmentary view partially in rear elevation and partially in transverse section through the combine.
Figure 11:
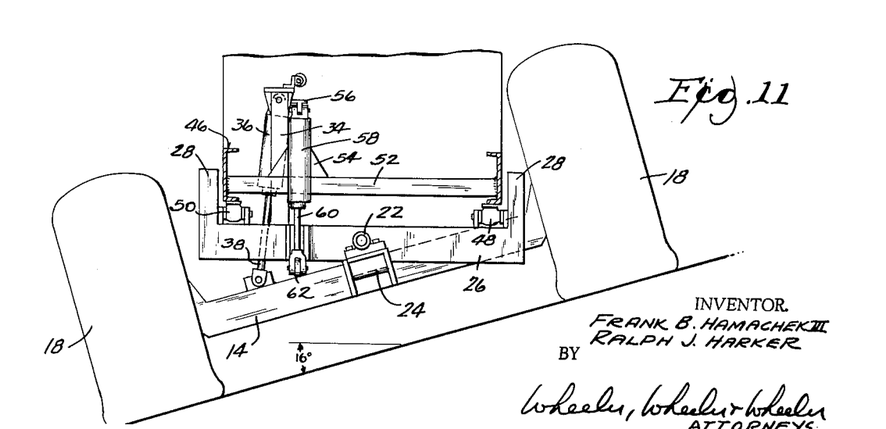
FIG. 11 is a fragmentary diagrammatic view partially in transverse section comparable to FIG. 9 and showing the yoke portion of the gimbal joint as it appears with roll displacement from horizontal.

The viner frame 46 is pivoted upon the transversely aligned bearing fittings 48 and 50 mounted on the cross member 26 of the yoke as shown in FIGS. 9, 11 and 12. The cross member 52 on the viner frame 46 has a post 54 having an overhanging arm 56 with which the ram cylinder 58 is connected. The piston 60 of ram 58 is pivoted to a bracket arm 62 which projects rearwardly from the cross member 26 above the yoke. The arrangement permits the viner frame 46 to have pitch adjustment with respect to the yoke by admitting hydraulic liquid under pressure of pump 40 to either end of the ram 58 subject to the control of the solenoid valves 64 or 66. The opening and closing of these valves is dependent upon automatic regulating mechanism now to be described.

The regulator may conveniently be enclosed in a housing 70 mounted on the side of the viner as shown in FIG. 9. Within this housing is a base 72 upon which there is mounted a shallow reservoir 74 which may advantageously be cruciform as shown in FIG. 12. The various arms of the reservoir are desirably at 90 degrees from each other and contain a liquid 76, such as oil, to a shallow depth. In each of the four arms 78, 80, 82 and 84 are provided floats respectively identified by reference characters 86, 88, 90 and 92. Universally pivoted on the bottom of the reservoir, and upstanding at the center of the reservoir, is a switch actuator 94 having radial arms 96, 98, 100 and 102 connected with the respective floats. The upper end of the actuator rod 94, which is preferably of substantial height, is centered between the contact operators 106, 108, 110 and 112 of microswitches 116, 118, 120 and 122. The switches are respectively connected to control the solenoid valves 44, 66, 42 and 64.

The ball joint connection 95 between the switch actuator rod 94 and a post 97 upstanding from the bottom of the reservoir sufficiently centers the respective floats in the arms of the reservoir in which they are respectively located. This arrangement operates with virtually no friction, being superior in this regard to guiding floats individually and making the rod dependent on them for position.

By way of example and not by way of limitation, it may be noted here that in an exemplification of this device the upper free end of rod 94 is permitted only about one-sixteenth inch of movement in any direction, the switches used being so sensitive as to be operated in about one thirty-second of an inch of displacement of their contact operators.

Further by way of example and not by way of limitation, it may be noted that the particular embodiment herein disclosed is designed in practice to correct the level up to twenty-one percent of slope in a fore and aft or pitch direction (12 degrees) and twenty-eight percent of slope in a transverse or roll direction (16 degrees). When the displacement reaches the maximum amount specified, the ram pistons can move no further in their respective cylinders and therefore no extraneous stops are needed. If the slope of the land exceeds the amount for which the equipment is designed, no further adjustment is possible and the viner will simply operate at an undesirable angle until it reaches an area in which the slope is within the capacity of the apparatus.

Within the capacity of the apparatus, this device has been found to maintain the viner frame in its desired position of level with great sensitivity and accuracy. By adjusting the entire regulator by minutely pivoting its base 72 upon its own gimbal joint, the level of the regulator may be adjusted either to absolute horizontal or to any desired variation from horizontal to cause a corresponding adjustment of the entire viner.

The means for adjustment of the regulator will be apparent in FIG. 9. There is a pintle rod 126 about which the base 72 is adjustable by means of screw 128. This rod, in turn, is pivoted at 124. Adjustment about the pivot 124 is provided by means of screw 130 which has nuts thereon at 132 and 134 engaging the arm 136 which is an extension of rod 126.

The entire regulator and its means of adjustment as above described are mounted on the shelf 138 which projects laterally from the viner 140. The viner is a form of thresher and is conventional. Within the housing 142 is rotatably mounted a drum 144 which is hexagonal in cross section being made up of segments of screen cloth 146 and intervening radial flights 148. In practice, this may be rotated at about 20 r.p.m. in a counterclockwise direction as viewed in FIG. 9. The mesh of the panels 146 is sufficiently large to pass the peas or beans which are being threshed from the vines and pods. With the peas or beans will, of course, be a certain amount of trash. The work and the trash together will be picked up by a conveyor 147 which extends the whole length of the viner beneath the drum 144 and is trained over polygonal pulleys 149 and 151 which cause the conveyor to shake as it advances upwardly at an inclination across the supporting panel 153. The trash will tend to stay with the conveyor for discharge over the pulley 151 onto the ground, whereas the peas or beans will roll downwardly in a direction opposite to the shaking advance of the conveyor to be delivered therefrom onto conveyor 157, which operates in a trough 155 at the side of the viner. Conveyor 157 leads to a delivery point later to be described.

Within the sieve drum 144 is a beater cylinder 150, which likewise may be hexagonal in cross section and provided with blades or beaters at 152 which have a definite axial pitch. In practice, the beater shaft 154 may be rotated at about 200 r.p.m. The vines, with pods attached, are fed into the opening 156 by means hereinafter to be described and they are picked up by the flights 148 and dropped across the path of the rapidly rotating and helically pitched blades 152 which open the pods and dislodge the peas or lima beans or the like.

The pitch of the beater blades 152 advances the vines and pods toward the rear or discharge end of drum 144 of the viner 140. The rate of axial advance toward discharge can be varied by slightly changing the angle of the axis of the drum 144 and the coaxial beater shaft 154. If this axis inclines rearwardly, the movement of the vines and pods will be accelerated toward discharge as compared with the rate of movement if the axis is entirely horizontal or has an upward inclination in a rearward direction. The adjustment above described and illustrated in FIG. 9 provides the means by which the automatic regulator shown in FIG. 12 can be made to hold the viner axis either horizontal or, if desired, at some angle deviating slightly from horizontal to regulate the rate of advance of the vines.

When the vines and pods and peas or beans reach the rear end of the viner, they fall from beneath the hood 158 onto a conveyor 160 which is moving rearwardly and upwardly and comprises slats spaced sufficiently widely to permit peas or beans entrained with the vines to fall through onto the underlying gleaner conveyor 162, which is moving in the same direction and is comparable to the conveyor 147. The gleaned peas or beans will roll downwardly onto the cross conveyor 164 while the trash will be carried upwardly and discharged over the rear end 166, where it will fall to the ground. The vines will be similarly discharged onto the ground from the rear end portion 168 of the conveyor 160.

In general, the viner 140 is entirely conventional and it is only the mounting of the viner and the arrangements for conveying work to and from the viner with which the present invention is concerned.

Figure 1:
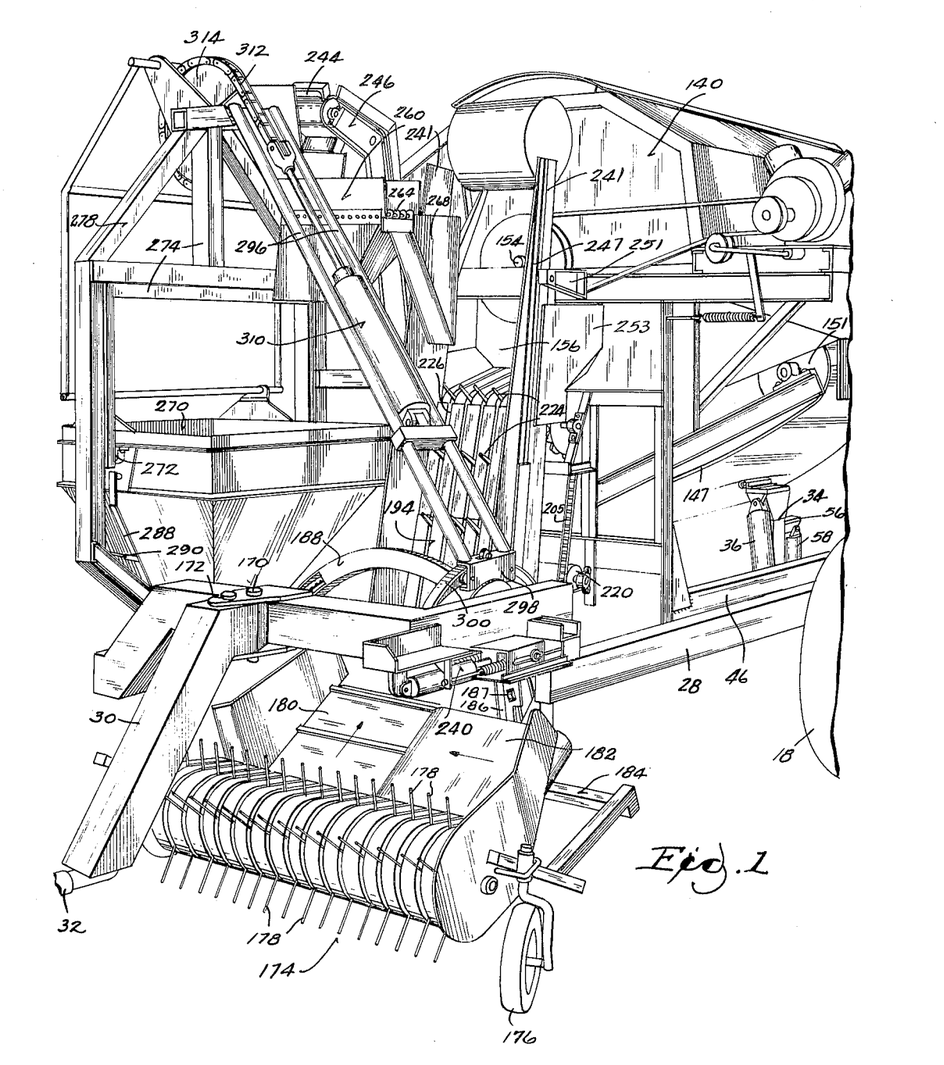
FIG. 1 is a fragmentary view in three-quarter front perspective of a combine embodying the invention.

When the combine is in transit, rather than in use, the tongue 30 is pivotally movable with respect to the yoke 28, being connected thereto by the pintle 170 (FIGS. 1 and 12). Multiple holes for an additional pin 172 are provided in order to quickly permit changing the relative position of the yoke 28 and tongue 30. When in transit or in operation, both pintle 170 and pin 172 rigidly connect the yoke to the tongue.

Figures 10, 14:
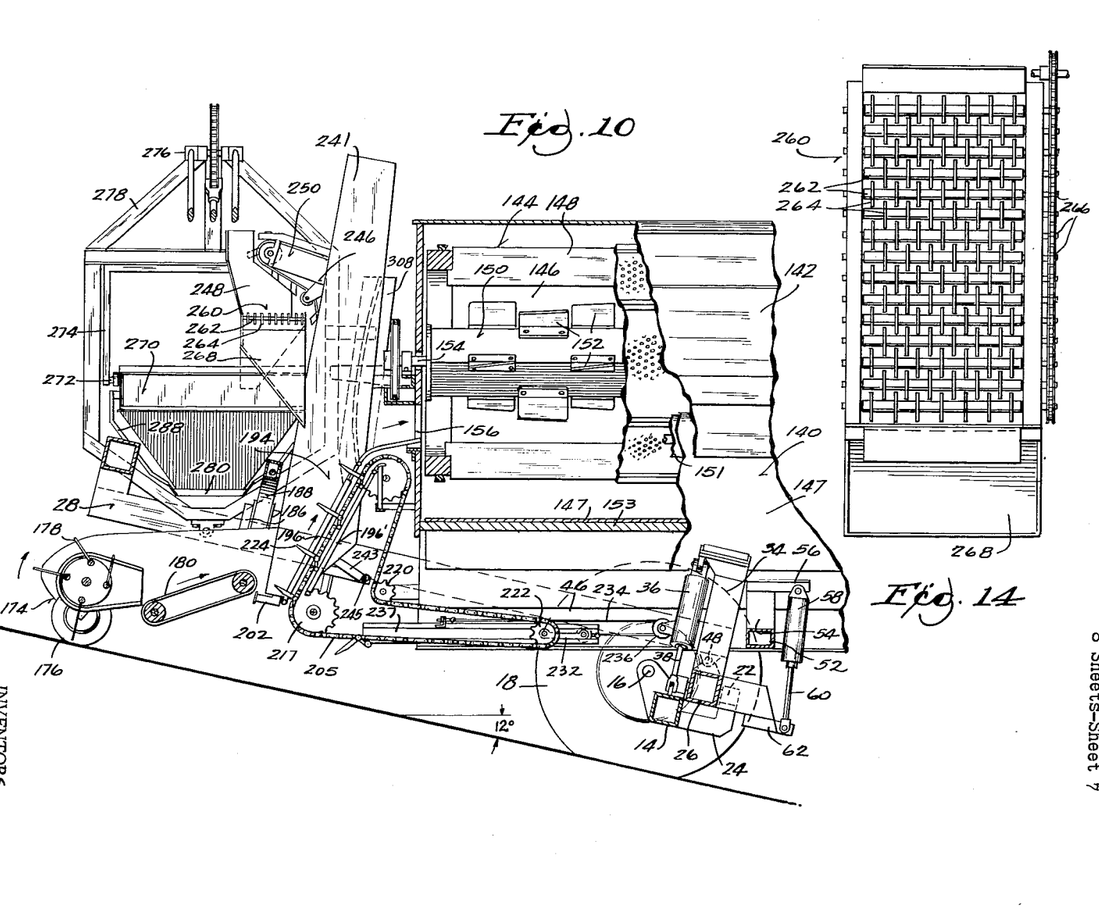
FIG. 10 is a diagrammatic view partially in elevation and partially in longitudinal section showing the relative positions of the parts with the viner portion of the apparatus with pitch displacement from horizontal.
FIG. 14 is a plan view of a "scalper" or device for separating unopened pods from the peas or beans and returning the pods for reprocessing.

Beneath the tongue is a pickup 174 having caster wheels 176 supporting it directly from the ground and having fingers 178 which project to pick up the vines from the ground and to lift them over the roll as the fingers are rotated clockwise as viewed in FIG. 1 and FIG. 10. The fingers retract as they deliver the work rearwardly. No mechanism is shown for this purpose as the entire pickup assembly is conventional.

The rearwardly moving apron conveyor 180 receives the vines directly from one section of the pickup 174. Vines from the other end of the pickup are delivered laterally onto the apron conveyor 180 by means of a transverse conveyor 182. This assembly is pushed ahead of the yoke frame 28 by means which accommodates the movement of the pickup device in following the contours of the ground traversed. As already stated, the yoke 28 is held perfectly horizontal in a roll direction by the automatic regulating mechanism. However, the pickup device has to tilt laterally to follow the contours of the earth in order that the fingers 178 will operate close to the ground under all circumstances.

In order to permit relative variation in position of the pickup device with regard to the yoke 28, the frame 184 of the pickup device is pivoted to links 186 which are bifurcated to embrace an arcuate track 188 which spans two sides of the yoke 28 and guides the links by means of rollers 190 rotatably connected with the upper ends of their respective links 186. Thrust rollers 187 are mounted for rotation on the links 186 and bear on the edges of the arcuate track 188. The arc of the track 188 is at least generally concentric with the axis of the bearings 20 and 22 upon which the yoke 28 pivots respecting the axle 14. Thus, just as the axle can deviate from the horizontal in a roll direction without affecting the horizontal position of the yoke 28, so the frame 184 of the pickup device can deviate from horizontal and still receive propulsive thrust through the rollers on lines 186 from the arcuate track which is really a part of the yoke.

The cut vines and pods picked up from the ground and discharged from the fingers 178 of the pickup roller 174 falls from conveyor 180 onto the elevator generically designated by reference character 194 and which leads to the admission port 156 of the viner 140.

The elevator 194 is desirably extensible and contractible to accommodate relative pitch adjustment of the viner as the viner remains horizontal notwithstanding the relative variation in a pitch direction of the viner frame and the yoke. While the yoke is capable of roll adjustment, its longitudinal extent will remain parallel to the ground traveled, its forward end being connected with a tractor and with the pickup assembly as above described. If the viner is operating on an upgrade, its admission port 156 will be much closer to the pickup delivery conveyor 180 than if the combine is operating on a downgrade.

Accordingly, the elevator 194 desirably comprises a series of closely spaced telescoping bars which form a deck-like platform over which the vines are moved. The bars are preferably of rectangular cross section and each such bar 196 includes an external sleeve 198 and an internal sleeve 200, the sleeves being in telescopic relationship as clearly shown in FIGS. 7 and 8. The vines are deposited by conveyor 180 onto a receiving platform 202 made up of a series of spaced bars 204. The backs of these bars have attached thereto hinge portions 206 to which the ears 208 of bars 196 are pivoted. Similarly, the inner extension sleeve 200 is provided at its upper end with ears at 212 which are in pivotal connection at 214 with brackets 216 leading into the receiving port 156 of the viner 140 as best shown in FIG. 6.

Figures 6, 7, 8:
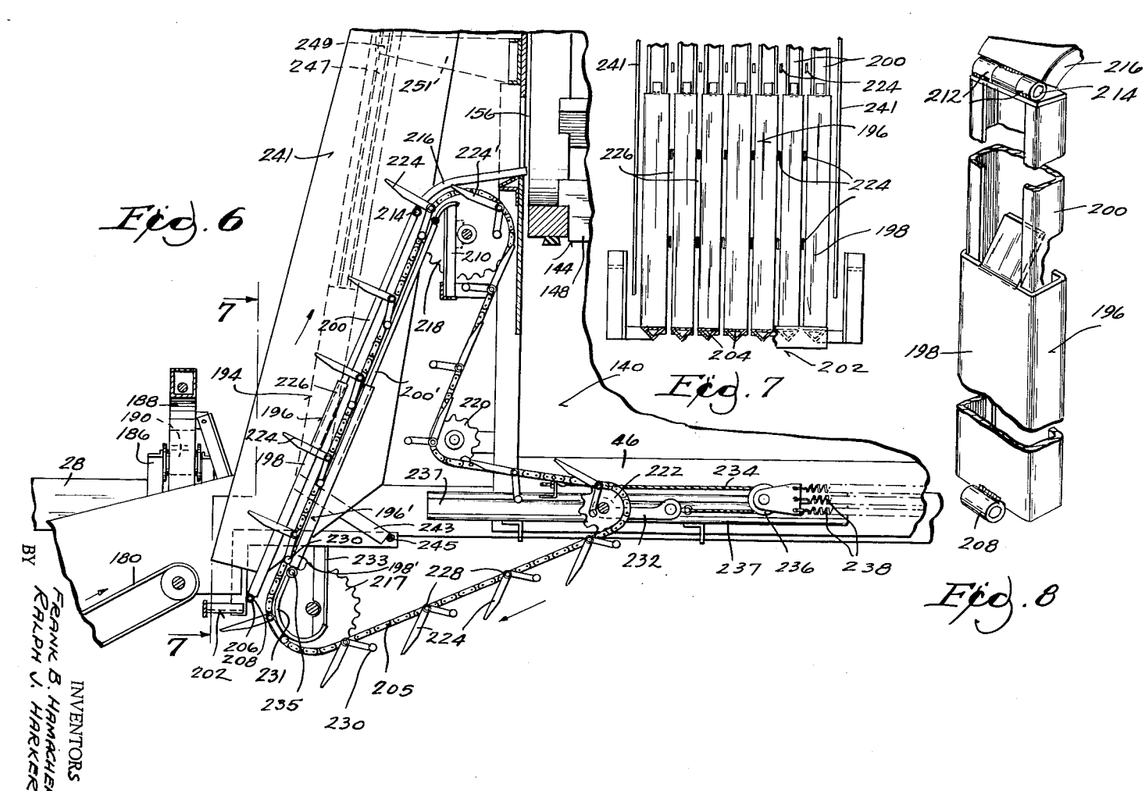
FIG. 6 is an enlarged fragmentary detail view of the telescopically adjustable elevator or feeder which carries vines with pods attached from the pickup conveyor into the feeding opening of the viner.
FIG. 7 is a fragmentary detail view taken on the line 7—7 of FIG. 6.
FIG. 8 is a greatly enlarged fragmentary detail view in perspective showing telescopically associated bars which constitute a part of the adjustable conveyor system shown in FIG. 6 and FIG. 7.

Chains 205 operating over the sprockets 217, 218, 220 and 222 carry retractible fingers 224 which project through the slots 226 between the bars as clearly appears in FIGS. 6 and 7. Each finger is pivoted to the spaced chains at 228 and each finger has a cam follower 230 which engages an arm 231 connected to bracket 233 for shaft of sprocket 217 and is guided by a single bar 196′ to maintain the fingers 224 in projecting position to elevate the vines along the bars. The lower bar 198′ is pivoted to arm 231 at 235. When the cam followers successively emerge from behind the inner extension sleeves 200′ at the point where the sleeves are connected with brackets 210 which have bearings for sprocket 218, the fingers collapse as shown at 224′ in FIG. 6, thus withdrawing themselves from the vines as the vines are pushed through the port 156 into the viner.

The telescopic relationship between the outer sleeve portion 198 and the inner sleeve portion 200 of the bars 196 facilitates the change in length of the bars in accordance with changes in position between the port 156 and the conveyor 180 which is delivering the vines from the pickup roll 174. To permit similar change in length of the path of travel of the several chains 205, the sprocket 222 is mounted on a carriage 232 for bodily retractive movement on a track 237 subject to the tension of a cable 234 which is acted on by pulley 236 subject to the bias of spring 238, all as shown in FIG. 6. The sprocket 222 and the carriage 232 are shown in an intermediate position midway between the ends of track 237. They occupy this position when the yoke 28 is substantially horizontal having no pitch longitudinally. If the combine is on a downgrade, the yoke 28 will have its forward end depressed with respect to the viner frame 46. This will increase the required length of the elevating conveyor 194 and the sprocket 222 and the carriage 232 will be required to move forwardly on the track 237 to provide the added length of chain. On an upgrade, the yoke will be elevated with respect to the viner frame and less length of elevating conveyor will be required at 194. Consequently, the required length of chain will be shorter and the spring 238 will draw sprocket 222 and carriage 232 rearwardly on track 237.

To confine the vines laterally, and to hold them on the conveyor 194, side boards 241 are used. These boards are pivoted at their lower ends. An arrangement for this purpose is shown in FIG. 6. The side board 241 has an arm at 243 which is pivoted at 245 to the yoke 28. A track 247 extends longitudinally of the board and is guided with respect to a roller 249 on an arm 251 which projects forwardly from the viner housing 142. The floating side board 241 is also lapped by a plate 253 which projects forwardly from the viner housing as best shown in FIG. 1. Relative movement of the side board and viner can occur without affecting the proper relationship of the side board and the conveyor, regardless of conveyor extension and contraction.

When the combine is in transit, the entire pickup mechanism may be lifted from the ground. A ram and other mechanism for this purpose are illustrated at 240 in FIG. 1 but are not described in detail, since they are never used when the combine is in operation and they form no part of the present invention.

Figure 3:
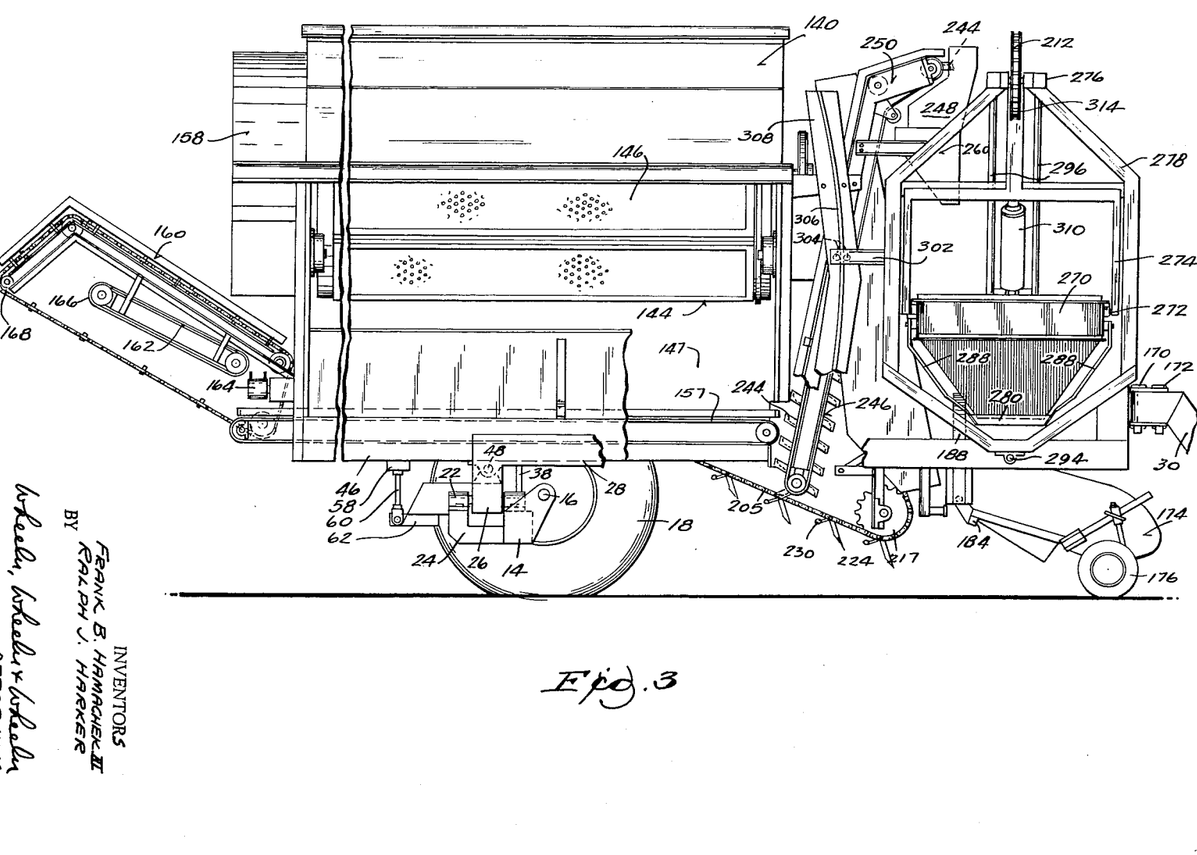
FIG. 3 is a view of the combine in right side elevation.

Reference has been made to the arrangement whereby the peas and beans separated from the vines are delivered onto a conveyor 157 which moves forwardly at the righthand side of the viner frame. As best shown in FIG. 3, the conveyor 157 discharges onto the scoop-shaped flights 244 of an elevating conveyor 246 which lifts the product to the top of the apparatus and dumps it into a hopper 248. The conveyor 246 and the frame 250 upon which it is entrained and the hopper 248 are all connected with the viner 140 and partake of the pitch and roll adjustments thereof.

The hopper 248 delivers peas or beans onto a "scalper" 260. The scalper is a device for returning for reprocessing any pods which have come to this point with the peas or beans. The scalper (FIGS. 1, 4 and 14) is a hopper-like device provided at its upper end with a horizontal series of parallel rods 262 bearing staggered disks 264 and all provided with sprockets 266 to be rotated positively by a common chain. The spacing between the disks and the rods is such that the peas or beans will fall through but any pods will rest on the disks. The direction of rotation of the disks is such that the pods will be fed toward the center of the machine and discharged into a chute 268 which returns them onto the infeed conveyor 194, whereby they are returned to the thresher or viner.

The scalper 260 drops the separated peas or beans into the storage bin 270, which is pivotally suspended at 272 upon a subframe 274 carried by rock shaft 276 from a frame 278. Frame 278 is mounted on the yoke 28 in a manner hereinafter described.

Figure 4:
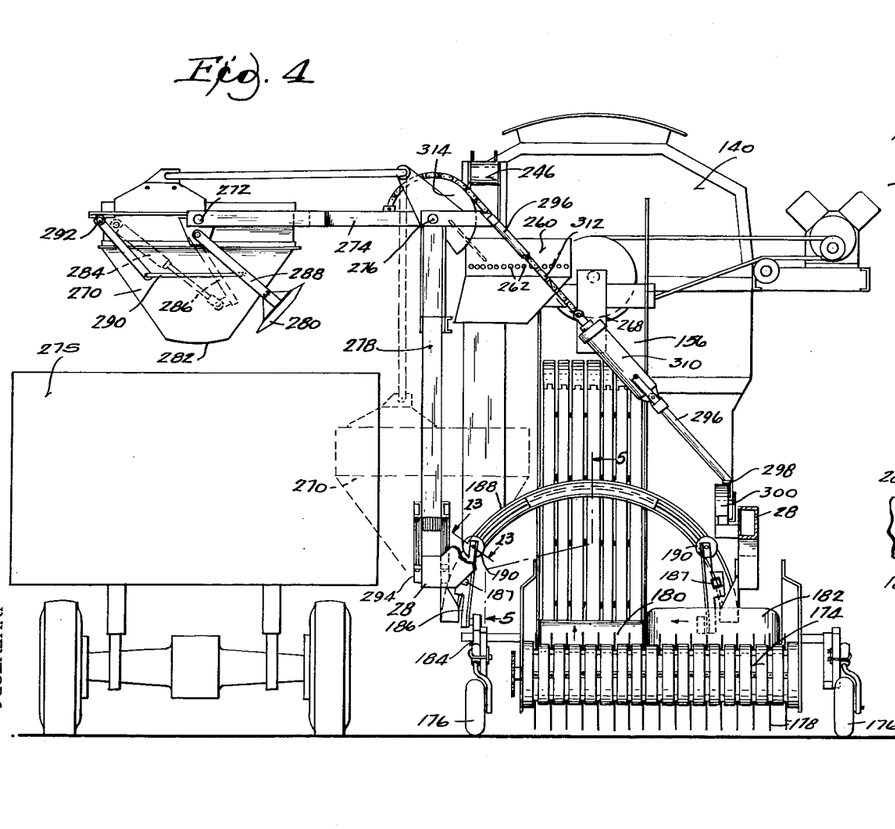
FIG. 4 is a view of the combine in front elevation.
Figure 5:
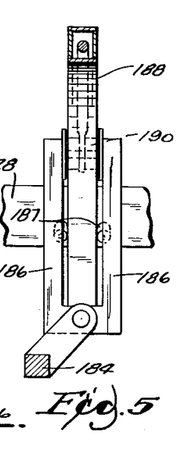
FIG. 5 is a fragmentary detail view taken in section on the line 5—5 of FIG. 4.

The bin 270 has a bottom opening normally closed by a gate 280 which can be swung aside as shown in FIG. 4 when the bin 270 is elevated and a receiving truck 275 is driven beneath it. The gate 280 and the bin 270 have complementary arcuate surfaces, the arcuate surface of the bin being shown at 282. A ram 284 operates an arm 286 which is pivoted to the bin. Connected to the arm 286 is one of a pair of arms 288 which support the gate 280 at both sides of the bin as viewed in FIG. 4 and is connected by linkage at 290 with a bell crank 292 which receives motion from a like arm at the remote side of the bin so that the thrust of the ram 284 is transmitted to the supporting arms at both sides of the gate.

The frame 278 to which the subframe 274 is pivoted should be held erect so that the bin 270 will be properly located to receive the peas or beans from the scalper at all times except when it is being dumped as shown in FIG. 4. It will be understood that the equipment will normally be stopped for this dumping operation.

To maintain the proper relationship between the bin and the scalper at all other times, the lower end of frame 278 is mounted on a pintle 294 carried by the yoke 28 as best shown in FIG. 3. A bracket 296 extends across the yoke and has its end connected with a carriage 298 riding on an arcuate track 300 at the other side of the yoke as best shown in FIG. 1. The center about which the track 300 is arcuate corresponds substantially to the axis of the pintle 294 upon which frame 278 is pivoted. Since the yoke 28 is mounted to remain horizontal in the direction of roll, the frame 278 will be required to remain vertical in the plane of FIG. 4 but it can pivot on the pintle 294 and the arcuate track 300 when the yoke pitches with the terrain, thereby permitting the frame 278 to be maintained vertically in the plane of FIG. 3, also.

To this end, the frame 278 is provided with a rearwardly projecting arm at 302 which has rollers 304 engaging the opposite sides of an arcuate track 306 mounted on support 308 which is rigidly connected to the viner 140. The viner is, as already described, maintained horizontal notwithstanding pitch changes of the yoke 28. Accordingly, the elevations of the front end of the viner and the elevation of the yoke will undergo relative changes in the use of the device. However, in all such changes, the rollers 304 coacting with track 306 will hold the frame 278 upright in the plane of FIG. 3, thus maintaining the discharge of conveyor 246, hopper 248 and scalper 260 vertically superimposed over the bin 270 at all times.

The ram 310 for raising the bin 270 from the normal position shown in dotted lines in FIG. 4 to the dumping position shown in full lines may conveniently be mounted on the brace 296 as best shown in FIG. 1.

Its piston is connected with a chain 312 trained over a segment guide pulley 314 mounted on the rock shaft 276 which carries subframe 274. When the overall length of the ram 310 is contracted, the chain requires the segment 314 to rotate rock shaft 276, thereby lifting the subframe and the bin 272 to dumping position to receive the truck 275 therebeneath.

Various chains and sprockets for the operation of conveyors and other parts have been shown herein and others have been omitted where they were unnecessary to an understanding of the invention, it being obvious to anyone skilled in the art how to drive the mechanisms herein disclosed.

In operation, the combine is drawn over a field on which the cut vines are lying. The fingers 178 of the pickup 174 elevate the vines and they are delivered by conveyors 182 and 180 onto the elevator 194 which delivers them into the viner.

The viner has a gimbal mounting. Its frame is pivoted on a transverse axis to the yoke. The yoke, in turn, is pivoted on a longitudinal axis to the wheel-supported axle. Float means controls rams for adjusting a roll movement of the yoke and a pitch movement of the viner frame to maintain the viner horizontal or in such relationship to horizontal as may be fixed by the preliminary adjustment of the control mechanism. The control mechanism preferably includes radial floats in the various arms of a cruciform trough in which there is a shallow body of liquid. All floats are connected to a single upright rod pivoted with respect to the trough and having a free end disposed to actuate the appropriate control switch for one of the ram valves to offset any displacement which may be registered by one of the floats.

The elevator 194 extends and contracts to compensate for variation in pitch adjustment between the viner and the yoke. The viner is connected with the mechanism which collects the product to maintain this also in proper position notwithstanding pitch and roll compensation between the axle and the viner frame.

We claim:

1. In a combine, the combination with a viner having a beater and a sieve drum rotatable on a predetermined axis extending longitudinally of the combine and depending for desired operation in part upon the pitch of said axis, of a wheeled axle, fixed bearing means for supporting the viner for tilting adjustment upon a fixed axis substantially parallel to the axle, and means for automatically adjusting the viner upon the axis for maintaining its desired position transversely of said axis regardless of pitch changes of position of the combine.

2. A combine according to claim 1 in which the means for maintaining the level of the combine comprises ram means, a source of fluid under pressure, valve means between the source and the ram means for controlling the operation of the ram means, solenoid means for the operation of the valve means, solenoid-controlling switch means in operative electrical connection with the solenoid means, means including a float and a chamber of liquid in which the float is buoyed, and operative connections from the float for the actuation of said switch means.

3. In a combine, the combination with a viner and a wheeled support, said viner having a beater and a sieve drum rotatable on a predetermined axis extending longitudinally of the combine and depending for desired operation in part upon the pitch of said axis, of means mounting the viner from the support for pivotal movement upon a predetermined transverse axis for control of its pitch angle and means for automatically levelling the viner upon said axis irrespective of the position of the support, said levelling means including ram means, a source of fluid under pressure for the operation of the ram means, valve means controlling the movement of fluid for the actuation of the ram means, solenoid means controlling the valve means, switch means controlling the solenoid means, a float having operative connections to said switch means for the opening and closing thereof, and a tank containing a liquid upon which the float means rests.

4. A combine according to claim 3 in which the wheeled support comprises an axle, the bearing means providing said axis being substantially parallel to the axle, a material pickup having means connecting it for relative vertical movement with respect to the axle according to ground level traversed, and means for delivering material from the pickup to the viner irrespective of changes of level of the pickup with regard to the viner.

5. In a combine, the combination with a wheeled axle and a viner, of means for providing a gimbal joint mounting for supporting the viner from the axle for universal tilting movement, means for automatically moving the viner upon said mounting for maintaining it level regardless of the position of the axle, and feeding means for delivering to the viner material to be vined, said gimbal joint including means for accommodating both changes in pitch and roll of the viner with regard to the wheeled axle a pickup device having means mounting it for relative movement vertically whereby to vary its position with regard to the leveled viner, and a telescopically extensible feeder for delivering material from the pickup device to the viner irrespective of pitch changes of viner position with respect to the feeder.

6. In a combine, the combination with a wheeled axle and a viner, of means for providing a gimbal joint mounting for supporting the viner from the axle for universal tilting movement upon a pitch axis and a roll axis with respect to said axle, means for automatically moving the viner upon said mounting for maintaining it level regardless of the position of the axle, and feeding means for delivering to the viner material to be vined, the means for maintaining the viner level including a float chamber having substantial extent parallel to each of said axes and having a liquid therein, a switch actuating bar pivotally connected with said chamber and projecting in a vertical direction with respect thereto, float arms projecting laterally from said bar and angularly offset from each other, floats on said arms buoyed on the liquid in said chamber, switch means having actuators in the path of relative movement of said bar, ram means for oscillating the viner upon its respective axes aforesaid and means whereby said switch means operatively controls the ram means for levelling the viner.

7. A combine according to claim 6 in which said chamber is cruciform, having diametrically opposite bays in pairs respectively aligned with said axes, there being a float in each bay, and an arm parallel to one of said axes connecting each float to said bar.

8. In a combine, the combination with a frame and a viner mounted thereon and having a sieve roll provided at one end with a feeder opening, of a pickup device having means pivotally connecting it with the frame, said pickup device being thereby variable as to height with respect to said opening as a result of pitch movement of the viner with respect to the combine frame, and a feeder leading from the pickup device to said opening and comprising relatively extensible parts.

9. A combine according to claim 8 in which said feeder comprises laterally spaced telescopic supports, chains having work propelling teeth projecting between said supports, means connecting telescopically related portions of said supports respectively with the viner and the feeder and means for taking up slack in said chains for maintaining the teeth in proper position between said supports irrespective of the extension of the telescopic supports.

10. In a combine, the combination with a wheeled axle and a viner having an admission port at its forward end, of means for the gimbal mounting of the viner from said axle, a rotary pickup device, means for supporting the rotary pickup device from the ground tranversed by the combine, means connecting the rotary pickup device with the axle to receive propulsive movement therefrom, said means including flexible connections for accommodating both vertical and lateral tilting relative movement between the pickup device and the axle, and an extensible feeder having relatively movable portions respectively connected with the viner and with the pickup device for delivering material from the pickup device to the said port irrespective of changes in relative position between the pickup device and the viner.

11. In a combine, the combination with a wheeled axle and a viner and means for discharging vined products and vines separately from the viner, of a storage receptacle for vined products and having a discharge opening in its bottom, means mounting the storage receptacle for pivotal movement and including a frame in pivotal connection with the viner, the storage receptacle being further provided with a pair of supporting arms in pivotal connection with said frame, means for oscillating said arms to elevate the storage receptacle and to move it laterally to a position for discharge, and means controlling the opening in the bottom of the receptacle and including mechanism for delivering through said opening the vined material stored in the receptacle.

12. In a combine, the combination with a wheeled axle, of a yoke in pivotal connection with the axle, a viner including a frame in pivotal connection with the yoke for movement on an axis at right angles to the axis of movement of the yoke respecting the axle on the pivotal connection first mentioned, ram means for effecting pivotal movement of the yoke and the viner frame upon their respective axes, ram-controlling float means having operative connections and including mechansim for maintaining the viner, level irrespective of changes of position of the axle, a rotary pickup device, means connecting the pickup device with the yoke to receive propulsive movement from the yoke, said connecting means including means for accommodating both vertical and lateral tilting movement of the pickup device with respect to the yoke, an extensible feeder leading from the pickup device to the viner and having portions respectively connected to the yoke and the viner to partake of relative vertical movement of the pickup device and the viner, means for separately discharging from the viner material vined and the vines from which said material has been removed, a frame pivotally connected with the yoke forwardly of the viner, means for maintaining the frame generally upright irrespective of movement of the yoke with respect to the axle, arms in pivotal connection with the frame, a storage container having an opening in its bottom and mounted on said arms, elevating conveyor means for delivering vined material and delivering such material into the storage container and means for oscillating said arms to move the container laterally for the discharge of such material, and normally closed means for releasing material from the container through said opening.

13. In a combine, the combination with a viner having a sieve drum and a wheeled support upon which the viner can be transported while in use, of a gimbal joint mounting for the viner for accommodating both pitch and roll movements of the viner on said support, and means for maintaining the viner level upon said mounting irrespective of the position of said support and including a tank having communicating chambers arranged in pairs, an upright rod between said chambers, separate floats in the respective chambers, liquid in the chambers and upon which the floats are buoyed, arms connecting the respective floats with said rod, switches having actuators surrounding the rod at a point spaced from said arms, and switch controlled hydraulic means for adjusting the viner with respect to said axle.

References Cited by the Examiner

UNITED STATES PATENTS

| | | | |
|---|---|---|---|
| 2,101,837 | 12/1937 | Blanchett | 280—6.1 X |
| 2,583,016 | 1/1952 | Ritter et al. | 280—6.1 |
| 2,640,582 | 6/1953 | Madiera | 198—139 |
| 2,656,194 | 10/1953 | Saulsbury | 280—6.1 |
| 2,663,466 | 12/1953 | Heltzel | 222—558 X |
| 2,762,185 | 9/1956 | Hyman et al. | 56—209 |
| 2,796,717 | 6/1957 | Orelind et al. | 56—209 |
| 2,821,059 | 1/1958 | Heitshu | 56—209 |
| 2,838,844 | 6/1958 | Sackett | 200—61.52 X |
| 3,033,584 | 5/1962 | Carmichael et al. | 280—6.1 |

ABRAHAM G. STONE, *Primary Examiner.*

ANTONIO F. GUIDA, T. GRAHAM CRAVER,
*Examiners.*